United States Patent
Huff et al.

Patent Number: 5,531,461
Date of Patent: *Jul. 2, 1996

[54] CHUCK WITH TORQUE LIMITING MECHANISM AND INCLINED PLANE FOR FINAL TIGHTENING

[75] Inventors: Robert O. Huff, Piedmont; Louis M. Shadeck, Anderson, both of S.C.

[73] Assignee: Jacobs Chuck Technology Corporation, Wilmington, Del.

[*] Notice: The term of this patent shall not extend beyond the expiration date of Pat. No. 5,411,275.

[21] Appl. No.: 385,970

[22] Filed: Feb. 9, 1995

Related U.S. Application Data

[63] Continuation-in-part of Ser. No. 127,621, Sep. 27, 1993, Pat. No. 5,411,275.

[51] Int. Cl.⁶ .................................................. B23B 31/12
[52] U.S. Cl. .............................. 279/62; 279/140; 279/902
[58] Field of Search .............................. 279/60–65, 140, 279/902

[56] References Cited

U.S. PATENT DOCUMENTS

| | | |
|---|---|---|
| 573,189 | 12/1896 | Vogel. |
| 962,746 | 6/1910 | Cogswell. |
| 1,159,344 | 11/1915 | Van Ness. |
| 1,473,488 | 11/1923 | McConnell. |
| 1,476,903 | 12/1923 | McConnell. |
| 1,513,332 | 10/1924 | McConnell. |
| 1,705,275 | 3/1929 | Von Neudeck. |
| 2,292,470 | 8/1942 | Ostberg ........................ 279/60 |
| 2,458,626 | 1/1949 | Norige ........................... 279/64 |
| 3,311,384 | 3/1967 | Kawasaki ...................... 279/62 |
| 3,807,745 | 4/1974 | Bent ............................... 279/60 |
| 4,305,597 | 12/1981 | McCarty ....................... 279/22 |
| 4,842,288 | 6/1989 | Ando ............................. 279/62 |
| 5,009,439 | 4/1991 | Sakamaki ...................... 279/62 |
| 5,125,673 | 6/1992 | Huff et al. .................... 279/60 |
| 5,145,194 | 9/1992 | Huff et al. .................... 279/62 |
| 5,215,317 | 6/1993 | Jordan et al. ................. 279/63 |
| 5,411,275 | 5/1995 | Huff et al. ................... 279/902 |

*Primary Examiner*—Steven C. Bishop
*Attorney, Agent, or Firm*—Fish & Neave; Robert R. Jackson

[57] ABSTRACT

A chuck for releasably holding a tool such as a drill bit has a torque limiting coupling in the mechanism which is rotated manually to close the jaws of the chuck on the tool. When the chuck has been tightened on the tool by a certain amount, the torque limiting coupling releases. Thereafter, continued manual rotation of the component which provides the input to the coupling operates a cam and cam follower mechanism which forces the jaws of the chuck into even tighter engagement with the tool. When the chuck is subsequently loosened to release the tool, the cam and cam follower mechanism automatically resets to ready the chuck for reuse.

10 Claims, 5 Drawing Sheets

CHUCK WITH TORQUE LIMITING MECHANISM AND INCLINED PLANE FOR FINAL TIGHTENING

This is a continuation-in-part of application Ser. No. 08/127,621, filed Sep. 27, 1993, now U.S. Pat. No. 5,411,275.

BACKGROUND OF THE INVENTION

This invention relates to chucks for releasably holding tools (e.g., drill bits), and more particularly to such chucks which can be easily and simply operated to very securely hold a tool without the need for a key to tighten the chuck on the tool.

Chucks with keys for imparting final tightening torque to the chuck to securely hold a tool are well known. While such chucks have been highly successful, they may have certain disadvantages. For example, the key must be removed from the chuck before the chuck is rotated at high speed (e.g., in a drilling operation). Failure to remove the key may unbalance the chuck when rotated at high speed, or cause the key to be thrown out from the chuck in a radial direction in a possibly unsafe manner. Although the key must thus be frequently removed from the chuck, the key must somehow be kept with the chuck or it may become lost.

Because of these disadvantages of keyed chucks, there has been increasing interest in recent years in chucks which can be operated by hand without the need for keys (see, for example, Huff et al. U.S. Pat. No. 5,125,673 and Jordan et al. U.S. Pat. No. 5,215,317). Some of these keyless chucks have been highly successful, but there is always room for further improvement.

To be acceptable a chuck must be able to hold a tool very securely. Chuck jaws with relatively fine threads serve this objective because fine threads give increased mechanical advantage. However, fine threads make a chuck relatively slow to operate, thereby making the chuck objectionable or even unacceptable to some users. A chuck should also be as simple and easy to operate as possible. For example, it is preferable for the operator to be able to use a single, simple type of motion to tighten or loosen the chuck. The chuck should also reset reliably and automatically after each use so that no additional resetting operation is required from the operator.

In view of the foregoing, it is an object of this invention to provide improved chucks.

It is another object of this invention to provide manually operable, keyless chucks which do not require especially fine jaw threads to hold a tool very securely, indeed more securely than conventional keyless chucks with fine threads.

It is still another object of this invention to provide manually operable, keyless chucks which require the operator to perform only a single, straightforward motion to tighten or loosen the chuck, and which automatically reset after each use in a highgly reliable manner.

SUMMARY OF THE INVENTION

These and other objects of the invention are accomplished in accordance with the principles of the invention by providing a chuck with a torque limiting mechanism between (1) the chuck component (typically a sleeve) which is manually rotated to tighten the chuck on a tool and (2) the chuck component (typically a nut) which is rotated by the sleeve to advance the jaws of the chuck to grip the tool. When the jaws have been tightened on a tool to a predetermined degree, the resistance to further tightening causes the torque limiting mechanism to release. This allows the sleeve to rotate relative to the nut. The above-described initial tightening of the jaws on the tool also compresses a plurality of rolling cam follower elements (e.g., ball bearings) between a proximal-facing surface of the nut and a distal facing surface which rotates with the sleeve. When the sleeve rotates relative to the nut, the cam follower elements roll along segments of the surfaces between which the cam follower elements are compressed. These segments on at least one of the surfaces are inclined toward the other surface in the direction in which the cam follower elements roll so that the cam follower elements force the nut axially forward relative to the body of the chuck as the cam follower elements roll. This forward motion of the nut forces the jaws farther forward, thereby providing final tightening of the chuck jaws on the tool. Rotation of the sleeve relative to the nut, especially during operation of the above-described cam follower elements, is preferably facilitated by rolling bearing elements between the chuck body and the component that rotates relative to the nut during operation of the cam follower elements. These rolling bearing elements can be ball bearings, but in a particularly preferred embodiment they are substantially cylindrical roller bearings.

When the chuck is again loosened, the cam follower elements are no longer axially compressed between the surfaces along which they roll as described above. A relatively light spring is therefore effective to automatically restore the cam follower elements to their initial positions relative to the inclined surface segments along which they roll.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
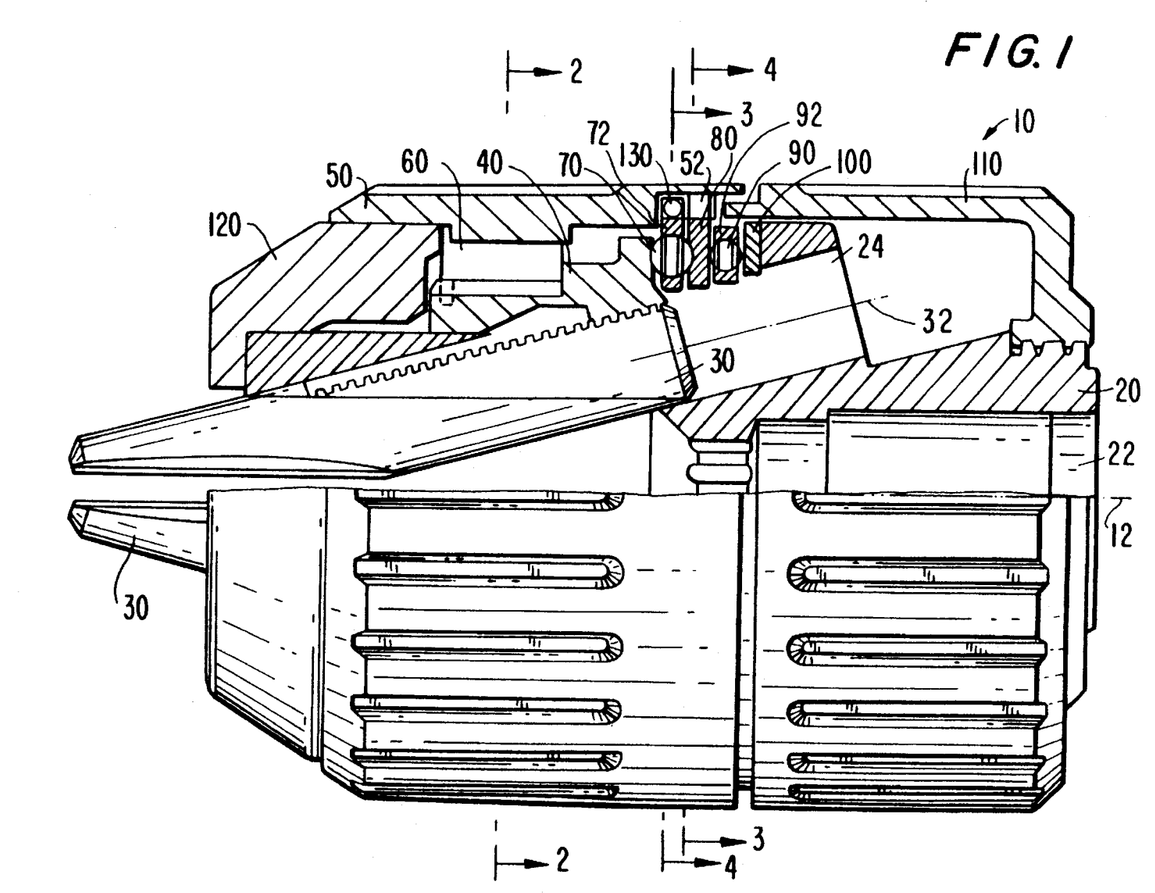
FIG. 1 is an elevational view, partly in section, of an illustrative chuck constructed in accordance with the principles of this invention.

As shown in FIG. 1, a chuck 10 constructed in accordance with the principles of this invention has a main body 20 with a central longitudinal bore 22 and three subsidiary bores 24 spaced equidistantly from one another around the central longitudinal axis 12 of the chuck. (Only one of bores 24 is visible in FIG. 1.) The proximal (right-most) end of bore 22 is adapted to receive a driver for the chuck (e.g., the end of the shaft of a manual or powered drill). Bores 24 are inclined toward one another in the distal direction (toward the left) and communicate with the distal portion of bore 22.

A longitudinal jaw 30 is disposed in each of bores 24. Each of jaws 30 is reciprocable along its longitudinal axis 32. Jaws 30 are reciprocated by nut 40, which is rotatably mounted on body 20 concentric with axis 12 and threadedly engaged with each of jaws 30. Rotation of nut 40 relative to body 20 therefore causes jaws 30 to move in unison, either toward or away from axis 12, depending on the direction of rotation of the nut. Nut 40 is rotated by rotation of annular front sleeve 50 which (like nut 40) is rotatably mounted on body 20 concentric with axis 12. In general, torque is transmitted from sleeve 50 to nut 40 by ring 60 which is disposed between elements 40 and 50 concentric with axis 12. The construction and operation of ring 60 are described in more detail below.

Figure 3:
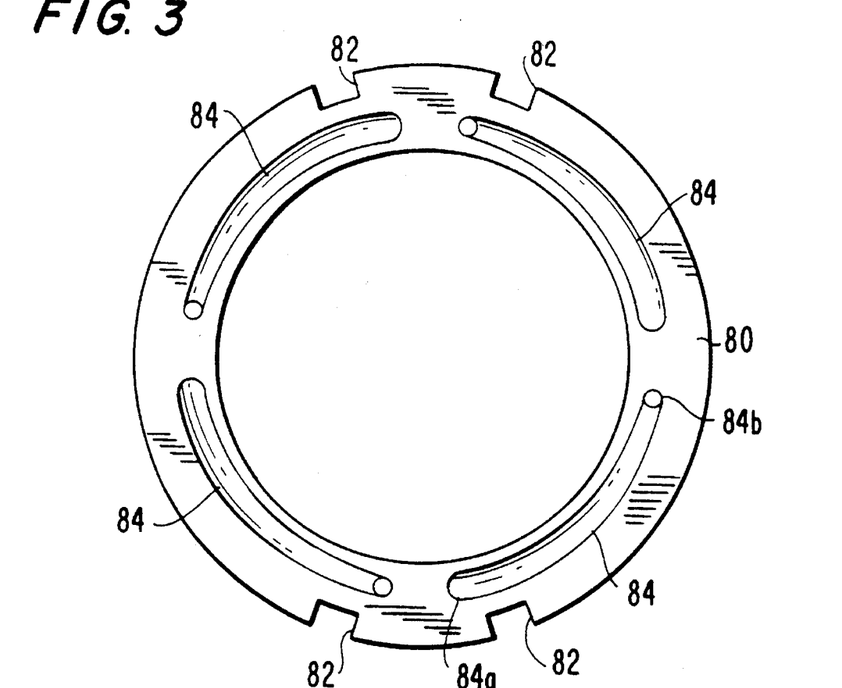
FIG. 3 is an elevational view of one part of the chuck of FIG. 1 taken in the direction of arrows 3 in FIG. 1.
Figure 4:
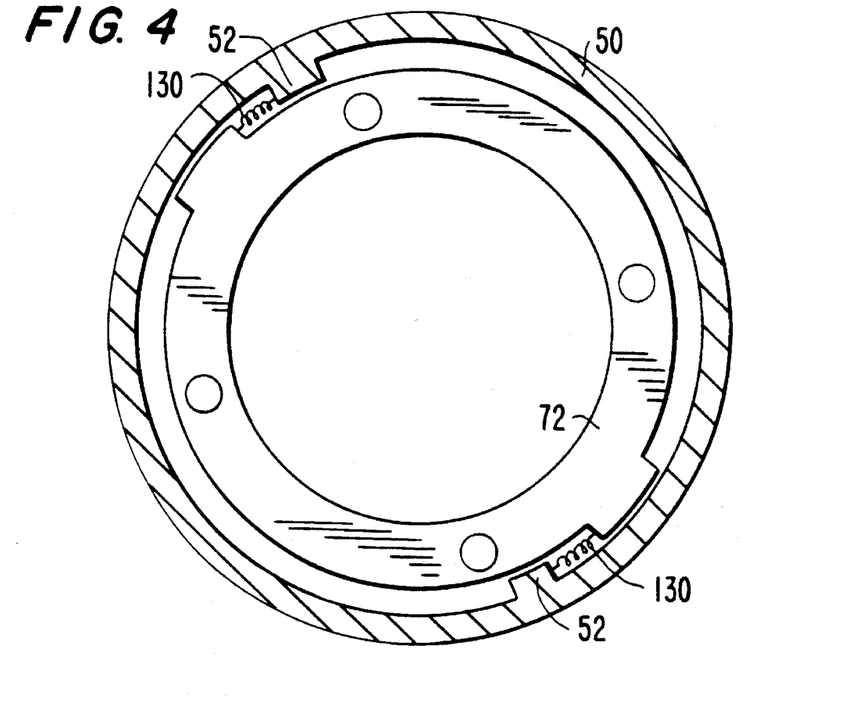
FIG. 4 is a partial sectional view taken along the line 4—4 in FIG. 1.
Figure 5:
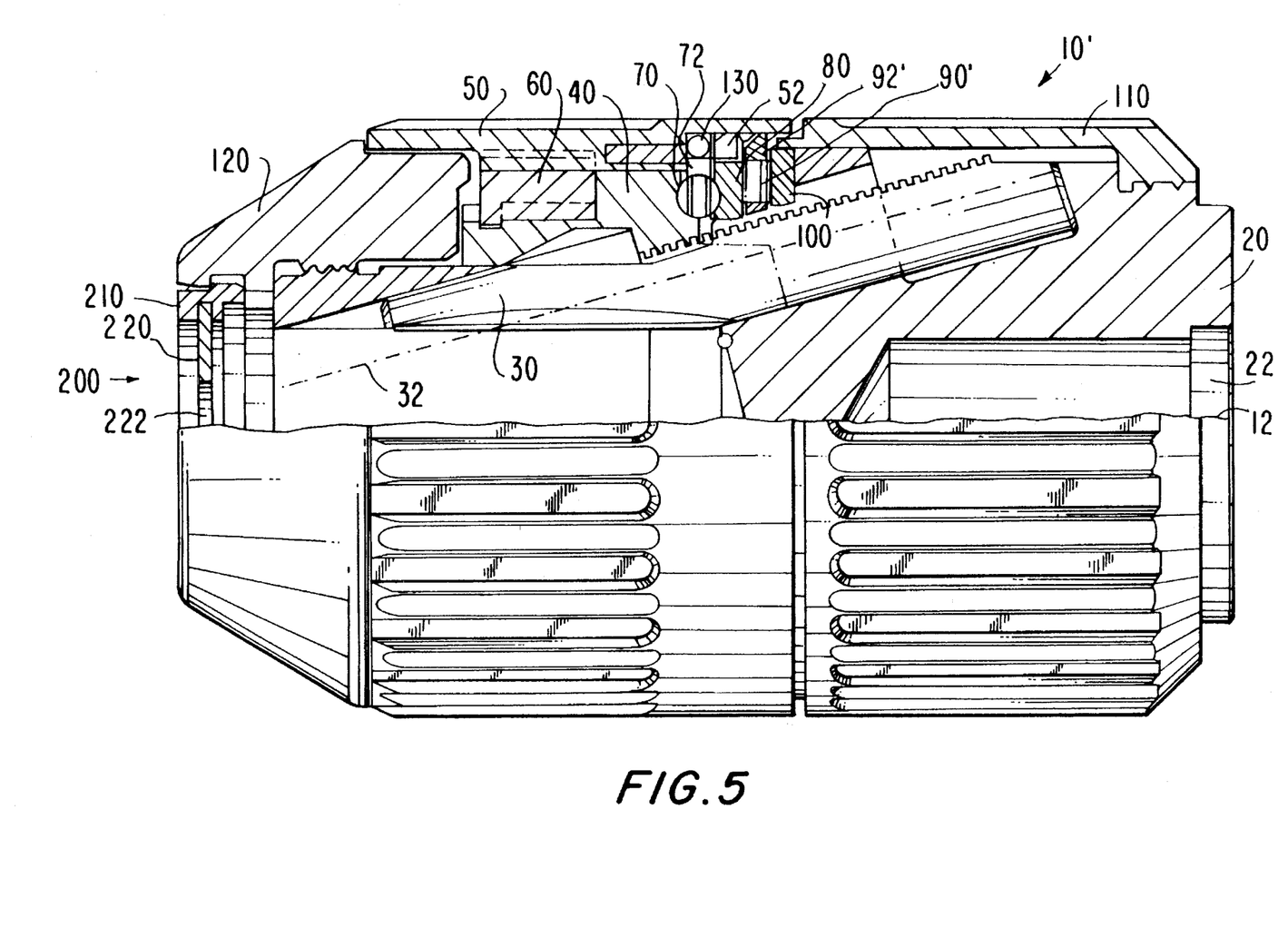
FIG. 5 is a view similar to FIG. 1 showing another illustrative embodiment of this invention.

Behind nut 40 (in the proximal direction) is a plurality of ball bearings 70 spaced from one another in an annular array concentric with axis 12 by being disposed in similarly spaced apertures in cage ring 72 (see also FIG. 4). In the particular embodiment shown in the drawings there are four balls 70 equally spaced from one another around axis 12. Behind ball bearings 70 (again in the proximal direction) is an annular cam ring 80 which is concentric with axis 12. Cam ring 80, which is another part that is described in more detail below, is constrained to rotate with sleeve 50 at all times by lugs 52 on sleeve 50 projecting radially inward into mating notches 82 (FIG. 3) in cam ring 80.

Behind cam ring 80 (in the proximal direction) is another ball bearing structure including a plurality of ball bearings 90 spaced from one another in an annular array concentric with axis 12 by cage ring 92. (Cage ring 92 is optional and can be omitted if desired.) In the proximal direction ball bearings 90 bear on annular bearing race 100 on body 20. A rear sleeve 110 is secured to the rear of body 20. Nose piece 120 is pressed onto the distal end of body 20 and thereby holds elements such as 40, 50, and 60 on body 20. However, limited motion of nut 40 parallel to axis 12 is permitted.

Figure 2:
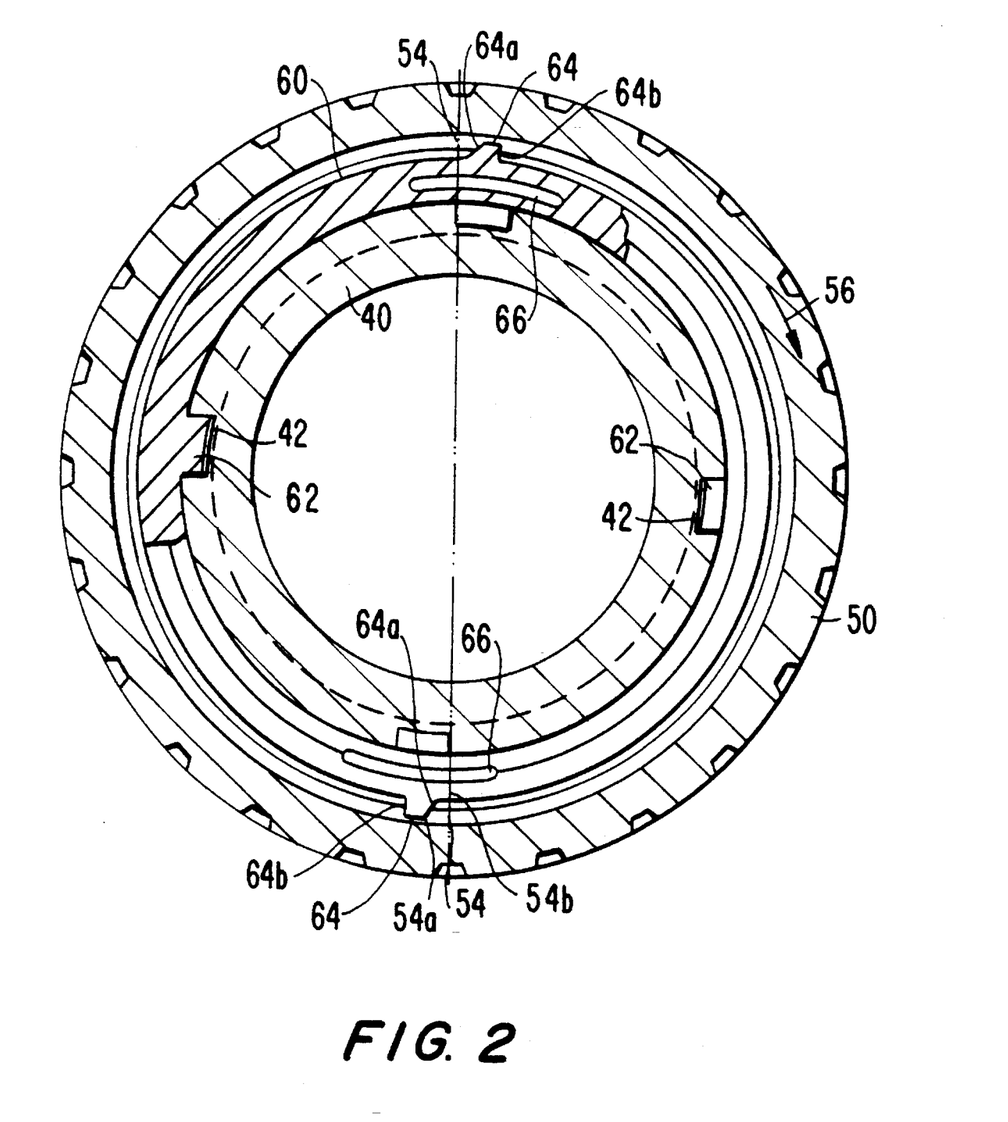
FIG. 2 is a partial sectional view taken along the line 2—2 in FIG. 1.

The construction of ring 60 and associated parts is shown in more detail in FIG. 2. Ring 60 has a pair of diametrically opposite, radially and axially extending lugs 62, each of which projects radially inward into a mating axially extending channel 42 in nut 40. Nut 40 and ring 60 are thereby constrained to rotate with one another at all times. Ring 60 also has a pair of diametrically opposite, radially and axially extending lugs 64 which project radially outward from its outer surface. Each of lugs 64 has a substantially radial face 64b and a generally opposite inclined face 64a. Radially inside each of lugs 64 ring 60 has a circumferentially and axially extending aperture 66 which allows the adjacent lug 64 to move radially inward under certain conditions as described below.

Lugs 64 on ring 60 interdigitate with radially and axially extending lugs 54 on sleeve 50. Lugs 54 are diametrically opposite one another and project radially inward from the sleeve. Like lugs 64, each of lugs 54 has a substantially radial face 54b and a generally opposite inclined face 54a. When sleeve 50 is rotated in the direction indicated by arrow 56 in FIG. 2 (which is the direction of sleeve rotation required to tighten jaws 30 on a tool), sleeve 50 can rotate relative to nut 40 until the inclined surfaces 54a of lugs 54 contact the inclined surfaces 64a of lugs 64. Thereafter, continued rotation of sleeve 50 in direction 56 causes ring 60 and therefore nut 40 to rotate in direction 56. This causes jaws 30 to move in the distal direction until the tool is gripped by the jaws.

When jaws 30 contact the tool, it becomes increasing difficult to continue to rotate nut 40 in direction 56 as the tool gripping force exerted by the jaws increases. It should also be noted that another consequence of the gripping force exerted by jaws 30 on the tool is a reaction force which causes nut 40 to move in the proximal direction and apply a compressive force to balls 70, cam ring 80, and balls 90. When the manual torque which must be applied to sleeve 50 to continue to rotate nut 40 in direction 56 reaches a predetermined threshold torque, ring 60 flexes inwardly in the vicinity of lugs 64 and apertures 66, thereby allowing each of lugs 54 to pass the lug 64 with which it was formerly in contact. The structure thus described therefore acts as a detent-type torque limiting mechanism. When the detent of this torque limiting mechanism releases, sleeve 50 can continue to rotate in direction 56 without further rotating ring 60 or nut 40. Cam ring 80, however, continues to rotate in direction 56. And because balls 70 have been compressed between nut 40 and cam ring 80, balls 70 begin to roll along the mutually opposing faces of non-rotating nut 40 and rotating cam ring 80. As balls 70 thus roll, they carry cage ring 72 with them. In particular, it will be noted that during this phase of the operation, cage ring 72 rotates about axis 12 in direction 56 at one-half the speed at which sleeve 50 and cam ring 80 are rotating. Springs 130, which as best seen in FIG. 4 extend between sleeve 50 and cage ring 72, are stretched (i.e., placed in increasing tension) by this rotation of sleeve 50 relative to cage ring 72.

As shown in FIG. 3, the surface of cam ring 80 along which balls 70 roll as described above has four arcuate channels 84 spaced from one another around the cam ring. Each of balls 70 rolls in a respective one of channels 84. These channels have cross sections which are concave to complement the convex outer surfaces of balls 70. Each of channels 84 becomes gradually shallower in the direction opposite direction 56. Accordingly, as cam ring 80 rotates relative to nut 40 in direction 56, each ball 70 rolls from the deeper end 84a of the associated channel toward the shallower end 84b of that channel. Cam ring 80 thereby forces balls 70 to move in the distal direction. Balls 70 in turn force nut 40 and jaws 30 to move in the distal direction, thereby significantly tightening the grip of jaws 30 on the tool being held by the chuck. The extreme shallow end 84b of each channel 84 may be slightly deeper than the immediately adjacent portion of that channel so that the associated ball 70 has a tendency to remain at the shallow end of the channel until the chuck is deliberately loosened by turning sleeve 50 opposite to direction 56 as described in detail below.

From the foregoing it will be seen that the bottom of each channel 84 is a ramp, inclined plane, or cam surface, with the associated ball 70 as a rolling follower for transmitting its axial motion as a follower to nut 40 and therefore to jaws 30. The slope of each channel 84 is extremely gradual, so that very large mechanical advantage is developed from the rotation of sleeve 50 relative to nut 40 during operation of cam ring 80 in the manner just described. It will be noted that each channel 84 subtends an angle of about 70°. Sleeve 50 therefore rotates in direction 56 through an angle of about 140° in order to roll balls 70 from the deeper ends 84a of channels 84 to the shallower ends 84b of the channels. Because lugs 54 are about 180° apart on sleeve 50 and lugs 64 are about 180° apart on ring 60, after lugs 54 and 64 pass one another to initiate the rolling of balls 70, the balls reach the shallow ends 84b of channels 84 before lugs 54 re-engage lugs 64.

When it is desired to loosen the chuck and remove the tool held by jaws 30, sleeve 50 is rotated opposite to direction 56. This causes balls 70 to roll back from the shallow ends 84b of channels 84 to the deeper ends 84a of those channels, thereby relieving some of the pressure of jaws 30 on the tool. As balls 70 approach the deeper ends of channels 84, the radial faces 54b of lugs 54 come into contact with the radial faces 64b of lugs 64. As a result of this contact, continued rotation of sleeve 50 opposite to direction 56 causes ring 60 and nut 40 to rotate opposite to direction 56. This retracts jaws 30 and releases the tool from the chuck. When the pressure of the jaws on the tool is sufficiently relieved, elements 70, 80, and 90 are no longer compressed between nut 40 and bearing race 100. This allows springs 130 (acting in tension in the circumferential direction between sleeve 50 and ball cage 72) to automatically rotate ball cage 72 (if necessary) relative to elements 50 and 80 so that balls 70 return to the deeper ends 84a of channels 84. The chuck is thus fully and reliably reset after each use so that it is always ready for the next use. Because springs 130 are only required to rotate cage ring 72 when there is substantially no compressive force on balls 70, the force of springs 130 can be relatively small so that even when they are fully stretched, they do not significantly tend to loosen the tightened chuck by strongly urging balls 70 to roll from the shallow ends 84b of channels 84 to the deeper ends 84a of those channels.

When it is next desired to clamp a tool in the chuck, sleeve 50 is again rotated in direction 56. The first nearly 180° of this rotation may be required to cause the inclined surfaces 54a of lugs 54 to reengage the inclined surfaces 64a of lugs 64. (Balls 70 do not roll during this relative rotation between sleeve 50 and nut 40 because balls 70 are not then compressed between the nut and ring 80.) Thereafter, continued rotation of sleeve 50 in direction 56 rotates ring 60 and nut 40 in the same direction, thereby moving jaws 30 in the distal direction toward the tool to be clamped. Operation of the chuck then continues as first described above.

Among the advantages of chuck 10 is that sleeve 50 is substantially decoupled from nut 40 while the chuck is tightened on a tool. The inertia of nut 40 is thereby reduced. This enhances the ability of the chuck to remain tight by resisting vibration and accelerations in the longitudinal and circumferential directions.

Although the various components of chuck 10 can be made of any of many suitable materials, particularly preferred materials for sleeve 50 and ring 60 are nylon and acetal, respectively.

It will be understood that the foregoing is only illustrative of the principles of this invention, and that various modifications can be made by those skilled in the art without departing from the scope and spirit of the invention. For example, the numbers of such components as lugs 54, lugs 64, balls 70, and channels 84 can be varied as desired. If the chuck is mounted on a tool having a spindle lock, sleeve 50 can be extended farther to the rear and separate rear sleeve 110 can be eliminated. As another example of possible modifications, channels 84 can be moved from the distal surface of ring 80 to the opposite proximalfacing surface of nut 40, or such inclined channels can be provided on both of these surfaces. Radially extending roller bearings may be used in place of balls 70, with appropriate modification of the shape of channels 84 to accept such rollers rather than balls. Instead of having lugs 64 deflect inwardly to pass lugs 54, lugs 54 could deflect outwardly to permit such passing. Instead of having stop surfaces 54b and 64b which are positioned to engage one another before sleeve 50 is rotated all the way back to the position in which the associated inclined surfaces 54a and 64a are facing one another, lugs 54 and 64 could be shaped so that they very easily pass one another when sleeve 50 is rotated in the loosening direction, and other stop surfaces (like surfaces 54b and 64b but with at least different angular positions and possibly also different axial positions) could then engage one another to prevent further rotation of sleeve 50 opposite to direction 56 without similar chuckloosening rotation of ring 60 and nut 40. Indeed, these alternative stop surfaces could be located on elements other than 50 and 60 if desired. As still another example of possible modifications, the torque limiting operation provided between sleeve 50 and ring 60 could alternatively be provided between ring 60 and nut 40. Instead of the releasable detent-type torque limiting mechanism shown in the drawings, the torque limiting mechanism could be of the friction type. Such a friction-type torque limiting mechanism takes advantage of the fact that static friction between two surfaces is greater than sliding friction between those surfaces under otherwise similar conditions. Thus static friction between elements 50 and 60 would be used to transmit torque from sleeve 50 to ring 60 until a threshold torque was reached, at which point reduced sliding friction would allow sleeve 50 to rotate relative to ring 60.

It will be noted that the torque limiting mechanisms employed in accordance with this invention are preferably "passive" in the sense that they do not store energy to any significant degree. This is true of both the depicted releasable detent-type torque limiting mechanism and the alternative friction-type torque limiting mechanism described immediately above. These passive torque limiting mechanisms transmit torque applied to them, but unlike a spring, for example, they do not significantly store energy which could cause the chuck to loosen after it has been tightened on a tool and while the tool is being used.

An alternative embodiment of this invention is shown in FIGS. 5–8. The construction and operation of the chuck 10' shown in these FIGS. is similar to chuck 10'. Accordingly, the same reference numbers are used in FIGS. 5–8 for parts that are the same or similar to parts shown in FIGS. 1–4. In general it will not be necessary to describe these parts or their operation again with reference to FIGS. 5–8 because a full description has already been provided in connection with FIGS. 1–4.

The major difference between the chuck 10 of FIGS. 1–4 and the chuck 10' of FIGS. 5–8 is that substantially cylindrical roller bearings 90' (rather than ball bearings 90) are used between ring 80 and bearing race 100. Roller bearings 90' (sometimes called needle bearings) have a number of advantages over ball bearings in this context. For example, because roller bearings have much more bearing surface area than balls of the same diameter, the diameter of rollers 90' can be made much less than the diameter of balls 90 for the same or even greater bearing capacity. The ability to use rollers 90' of smaller diameter helps shorten the axial length of the chuck. This is particularly important in a chuck design that otherwise tends to be axially elongated by an axial succession of components associated with the torque limiting mechanism, the cam and cam follower mechanism, etc.

Figure 6:
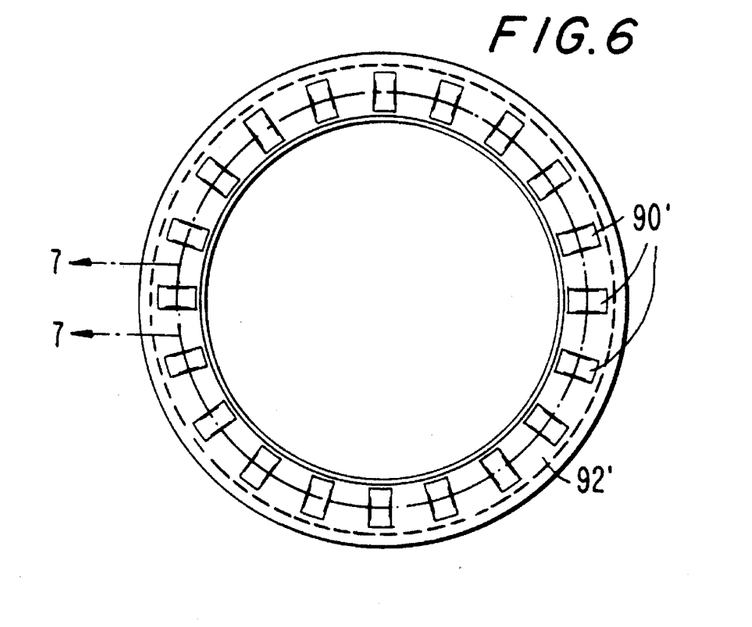
FIG. 6 is an elevational view of certain parts of the apparatus shown in FIG. 5.
Figure 7:
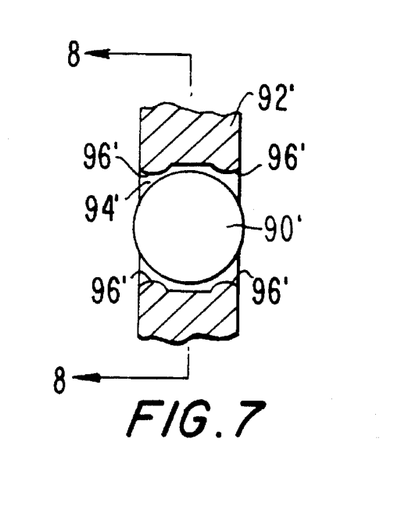
FIG. 7 is a sectional view taken along the line: 7—7 in FIG. 6.
Figure 8:
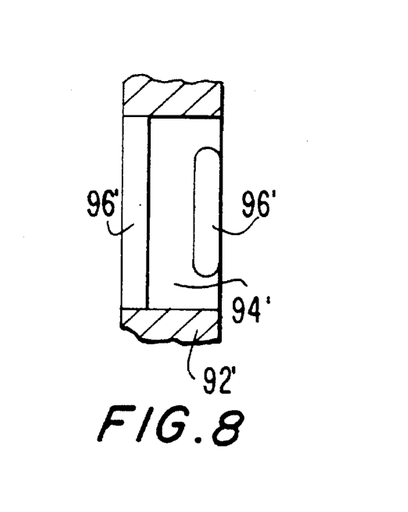
FIG. 8 is a sectional view taken along the line 8—8 in FIG. 7.

FIG. 6 shows that a plurality of roller bearings 90' is disposed in an annular array that is substantially concentric with the central longitudinal axis 12 of the chuck. The longitudinal axis of each roller bearing 90' extends radially outward from axis 12. Rollers 90' are rotatably disposed in apertures 94' in an annular cage member 92' (see FIGS. 6–8). Rollers 90' may be made of steel, while cage member 92' may be made of nylon. Each side of each aperture 94' that is parallel to the longitudinal axis of the roller 90' that is disposed in that aperture has two inwardly projecting ridges 96' for holding the roller in the aperture. All of the ridges 96' in an aperture are parallel to the longitudinal axis of the roller in that aperture. The two ridges 96' on the same side of an aperture are laterally spaced from one another, with each of these two ridges being adjacent a respective one of the two substantially planar faces of cage member 92'.

Another difference between chuck 10 and chuck 10' is that chuck 10' has a removable structure 200 in the nose 120 of the chuck. Structure 200 includes an outer plastic ring 210 concentric with axis 12, and an inner rubber ring 220 integral and concentric with ring 210. Ring 210 releasably latches into the typically metal nosepiece 120 of the chuck. Ring 220 has a central aperture 222 through which the shank of a tool such as a drill bit can be inserted into the chuck. If the tool shank is larger than aperture 222, rubber ring 220 deforms to allow the tool shank to enter. Assuming that the tool shank is at least as large as aperture 222, ring 220 holds and centers the tool in the chuck before the chuck jaws are tightened on the tool and after the tool is released from the jaws. Also, during use of a sufficiently large tool, ring 220 prevents debris from entering the chuck around the shank of the tool. If structure 200 becomes worn or damaged, it may be pried out of nosepiece 120 and replaced with a similar new structure 200.

It will be understood that the embodiment shown in FIGS. 5–8 is again only illustrative of the principles of this invention. For example, modifications of the kinds mentioned above after the discussion of FIGS. 1–4 are again applicable to the embodiment shown in FIGS. 5–8.

The invention claimed is:

1. A chuck for releasably gripping a tool comprising:

a main body;

a plurality of longitudinal tool-gripping jaws mounted for movement relative to said main body, each of said jaws being movable relative to said main body parallel to a longitudinal axis of that jaw, the longitudinal axes of said jaws being synclinal in a distal direction along said body;

a nut rotatably mounted on said body, said nut being also mounted for limited axial motion relative to said body parallel to said distal direction, said nut being threadedly engaged with each of said jaws for causing said jaws to move parallel to their longitudinal axes when said nut is rotated relative to said body or when said nut is moved axially relative to said body parallel to said distal direction;

a sleeve rotatably mounted on said body;

a torque limiting coupling operatively connected between said sleeve and said nut for causing said nut to rotate relative to said body with said sleeve in a jaw-tightening direction until said jaws have begun to grip said tool and more than a predetermined threshold torque must be applied to said sleeve to continue to rotate said nut in said jaw-tightening direction, after which said torque limiting coupling releases so that said sleeve can continue to rotate in said jaw-tightening direction with at least substantially reduced transmission of torque from said sleeve to said nut and therefore without further rotation of said nut in said jaw-tightening direction, said predetermined threshold having a value greater than a minimum required to couple said sleeve and said nut before said jaws grip said tool and substantially less than a value required to finally tighten said tool for operation;

a plurality of rolling cam follower elements disposed between a substantially proximal-facing first surface of said nut and a substantially distal-facing second surface that rotates relative to said body with said sleeve, said cam follower elements being axially compressed between said first and second surfaces only after said jaws have begun to grip said tool and said nut moves relative to said body in the proximal direction in reaction to the tool-gripping force applied to said tool by said jaws, each of said cam follower elements rolling, from initial positions relative to said first and second surfaces, along an arcuate segment of each of said first and second surfaces when said cam follower elements are compressed between said first and second surfaces and after said torque limiting coupling has released and said sleeve continues to rotate in said jaw-tightening direction relative to said nut, at least one of said segments along which each of said cam follower elements rolls being inclined toward another of the segments along which that cam follower element rolls in the direction in which that cam follower element rolls so that said cam follower elements force said nut to move in said distal direction relative to said body, thereby further tightening said jaws on said tool; and means for resiliently urging each of said cam follower elements to automatically return to its initial position relative to at least one of said first and second surfaces when said cam follower elements are not compressed between said first and second surfaces, wherein said second surface is disposed on a member of said chuck that is rotatable relative to said body, and wherein said chuck further comprises:

a rolling bearing structure disposed between a proximal-facing third surface of said member and a distal-facing fourth surface that is substantially fixed relative to said body, said rolling bearing structure facilitating rotation of said member relative to said body.

2. The apparatus defined in claim 1 wherein said rolling bearing structure comprises a plurality of rolling bearing members disposed in an annular array substantially concentric with a chuck axis about which said nut concentrically rotates.

3. The apparatus defined in claim 2 wherein said rolling bearing members are balls.

4. The apparatus defined in claim 2 wherein said rolling bearing members are substantially cylindrical rollers, each of which has a longitudinal axis that extends substantially radially outward from said chuck axis.

5. A chuck for releasably gripping a tool comprising:

a body structure having a longitudinal axis;

a plurality of longitudinal tool-gripping jaws mounted relative to said body structure so that the longitudinal axes of said jaws are inclined toward the longitudinal axis of said body structure in a distal direction along the longitudinal axis of said body structure, each of said jaws being movable relative to said body structure substantially parallel to the longitudinal axis of said jaw;

a jaw reciprocating structure mounted on said body structure, at least part of said jaw reciprocating structure being rotatable relative to said body structure about the longitudinal axis of said body structure in order to move said jaws relative said body structure substantially parallel to the respective longitudinal axes of said jaws; and a plurality of substantially cylindrical roller bearing members disposed between a substantially distal-facing surface of said body structure and a substantially proximal-facing surface of the rotatable part of said jaw reciprocating structure, said roller bearing members facilitating rotation of said rotatable part of said jaw reciprocating structure relative to said body structure.

6. The apparatus defined in claim 5 wherein each of said roller bearing members has a longitudinal axis which is substantially radial to said longitudinal axis of said body structure.

7. The apparatus defined in claim 6 wherein said roller bearing members are disposed in an annular array which is substantially concentric with said longitudinal axis of said body structure.

8. The apparatus defined in claim 5 wherein the rotatable part of said jaw reciprocating structure includes:

a nut portion threadedly engaged with said jaws so that rotation of said nut portion about said body structure causes said jaws to move relative to said body structure substantially parallel to the respective longitudinal axes of said jaws; and a nut reciprocating portion for reciprocating said nut substantially parallel to the longitudinal axis of said body structure and thereby additionally moving said jaws relative to said body structure substantially parallel to the respective longitudinal axes of said jaws.

9. The apparatus defined in claim 8 wherein said nut reciprocating portion is selectively rotatable relative to said nut portion, and wherein said nut reciprocating portion reciprocates said nut portion during rotation of said nut reciprocating portion relative to said nut portion.

10. The apparatus defined in claim 9 wherein said proximal-facing surface is disposed on said nut reciprocating portion.

\* \* \* \* \*